(12) United States Patent
Murakami et al.

(10) Patent No.: US 8,346,943 B2
(45) Date of Patent: Jan. 1, 2013

(54) METHOD AND APPARATUS FOR CONTROLLING A MULTIMEDIA GATEWAY COMPRISING AN IMSI

(75) Inventors: Shingo Murakami, Kanagawa (JP); Toshikane Oda, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 258 days.

(21) Appl. No.: 12/863,017

(22) PCT Filed: Jan. 24, 2008

(86) PCT No.: PCT/SE2008/050085
§ 371 (c)(1),
(2), (4) Date: Jul. 15, 2010

(87) PCT Pub. No.: WO2009/093942
PCT Pub. Date: Jul. 30, 2009

(65) Prior Publication Data
US 2011/0167160 A1    Jul. 7, 2011

(51) Int. Cl.
*G06F 15/16* (2006.01)

(52) U.S. Cl. ...................................... 709/227; 709/228
(58) Field of Classification Search .................. 709/227, 709/228
See application file for complete search history.

(56) References Cited

FOREIGN PATENT DOCUMENTS
WO    WO 2007/131548 A    11/2007

*Primary Examiner* — Adnan Mirza

(57) ABSTRACT

A multimedia gateway that has an ISIM is provided. The multimedia gateway comprises: request receiving means for receiving, from a client terminal, a request message that specifies a destination IMS AS and a communications protocol, and identifying an IMPU assigned to the client terminal, establishing means for establishing a session for communication with the IMS AS by means of the communications protocol, and establishing a connection with the IMS AS over the session, authentication information sending means for sending authentication information derived from the ISIM that contains the identified IMPU to the IMS AS, request sending means for sending the request message together with the identified IMPU to the IMS AS through the connection, response receiving means for receiving a response message from the IMS AS through the connection as a response to the request message, and response sending means for sending the response message to the client terminal.

24 Claims, 14 Drawing Sheets

FIG. 8

```
<UaProxyAddrs xmlns="urn:xxx:yyy">
    <Addr scheme="http">192.168.0.1:8080</Addr>
    <Addr scheme="rtsp">192.168.0.1:8090</Addr>
</UaProxyAddrs>
```

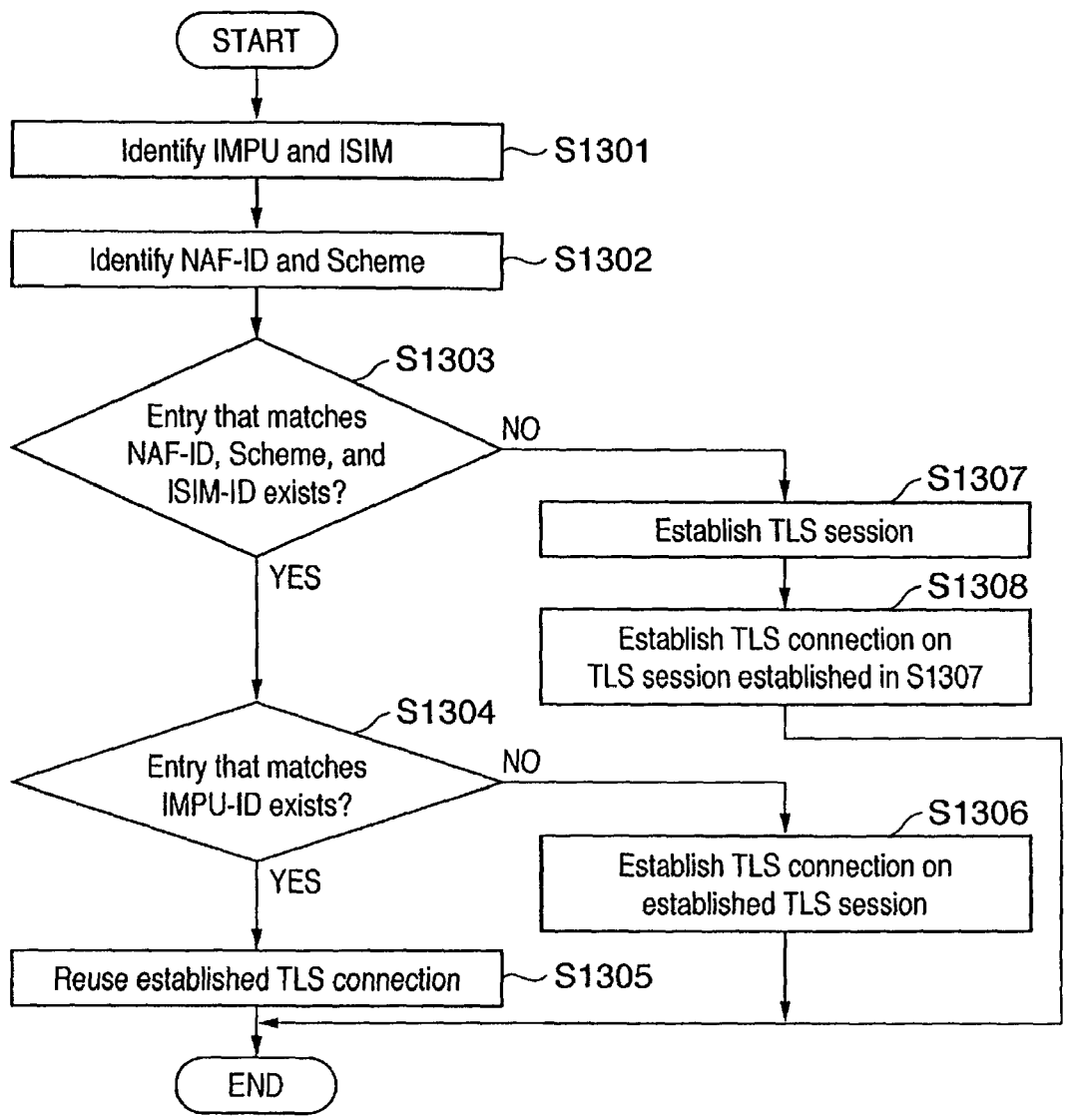

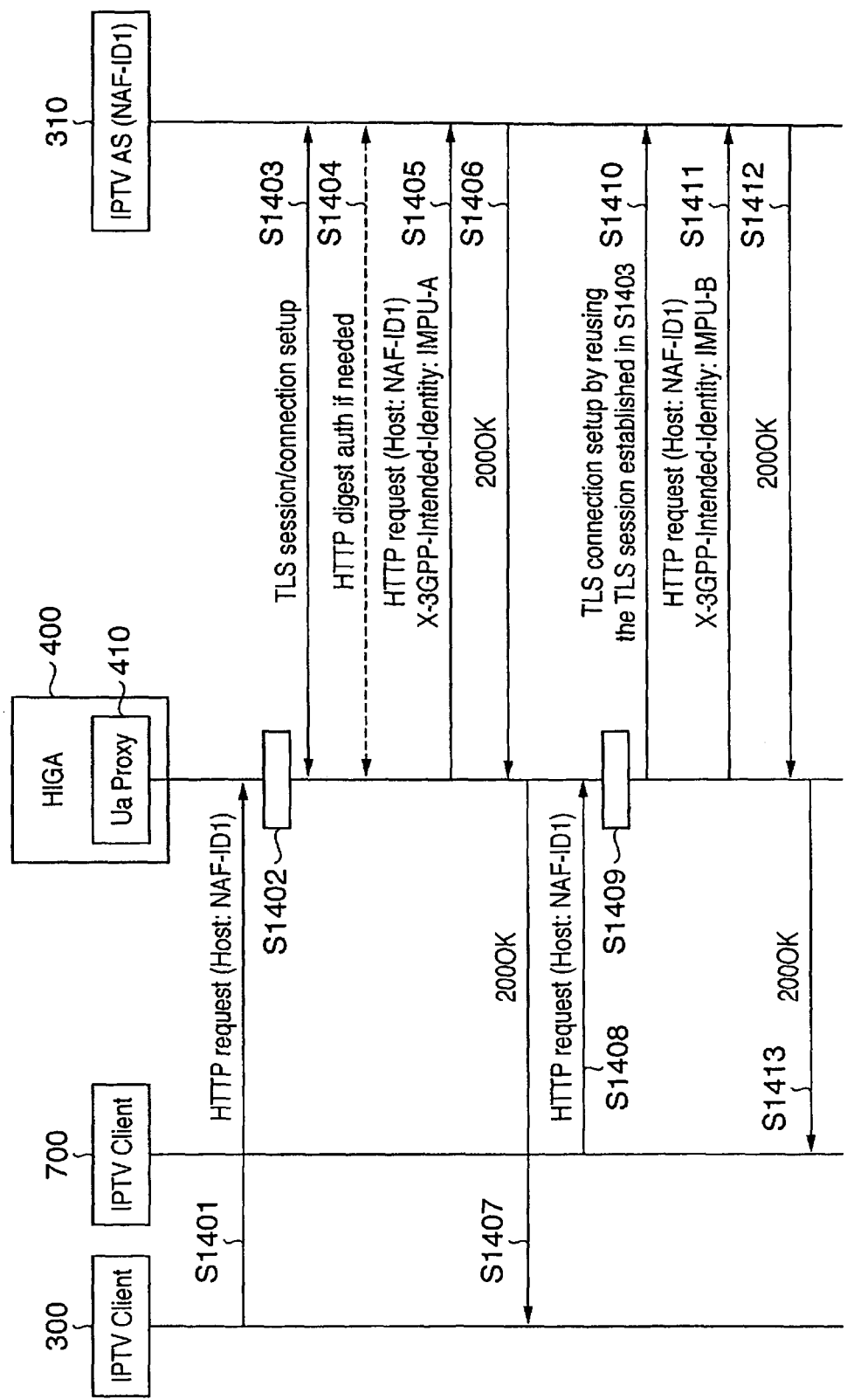

METHOD AND APPARATUS FOR CONTROLLING A MULTIMEDIA GATEWAY COMPRISING AN IMSI

TECHNICAL FIELD

The present invention relates to a multimedia gateway that mediates communication between a client terminal and an IP Multimedia Subsystem (IMS) network, and a method for controlling the multimedia gateway.

BACKGROUND

A network architecture called "IP Multimedia Subsystem" (IMS) has been developed by the 3rd Generation Partnership Project (3GPP) as an open standard for handling multimedia services and sessions in the packet domain (for the detail of the IMS, please refer to http://www.3gpp.org/ftp/Specs/html-info/22173.htm). Various communication terminals and devices (hereinafter referred to as IMS terminals) that conform to the IMS standard are now known. A typical example of an IMS terminal is a mobile phone with IMS functionality. A personal computer (PC), a personal digital assistant (PDA), or the like can also serve as IMS terminals if they are equipped with IMS functionality. IMS terminals can provide multimedia services by, for example, receiving video streaming from a video-streaming server over an IMS network.

However, many communication terminals (hereinafter referred to as non-IMS terminals) still exist that are not IMS-enabled (i.e., that do not have IMS functionality). International Publication No. WO 2006/045706 discloses a multimedia gateway called a "Home IMS Gateway" (HIGA), which enables these non-IMS terminals to access the IMS network.

According to WO 2006/045706, the HIGA is located in a private network, to which at least one non-IMS terminal is connected. The HIGA includes a Session Initiation Protocol (SIP) Back-to-Back User Agent (B2BUA) for communications between non-IMS terminals and the IMS network. The HIGA also includes a SIP gateway (implemented according to 3GPP TS 24.229 and IETF RFC 3261). The SIP gateway allows inter-operation between various client terminal signaling protocols and the SIP used by the IMS. For example, the SIP gateway may provide translation between ISDN-based signaling protocols and the SIP. Accordingly, the non-IMS terminals may or may not have SIP functionality.

FIG. 1 schematically illustrates the structure of a HIGA known in the art. A HIGA 100 includes a B2BUA 101, a device database (DB) 102, and at least one IMS Subscriber Identity Module applications (ISIMs) 150. The HIGA 100 may also have a SIP gateway (not shown). As an example, in FIG. 1, ISIMs 150 comprises two ISIMs, ISIM 160 and ISIM 170. Each ISIM stores a single IMS Private Identity (IMPI) and at least one of possibly multiple IMS Public Identities (IMPUs). In FIG. 1, the ISIM 160 stores an IMPI 161 and IMPUs 162 and 163. The ISIM 170 stores an IMPI 171 and IMPUs 172 and 173.

Three SIP clients 110, 111, and 112 in a private network 180 are connected with the B2BUA 101. Moreover, the B2BUA 101 may communicate with an IMS network 181 over a Gm interface, which as such is known to a person skilled in the art through e.g., 3GPP TS23.228 V7.6.0. The IMS network 181 includes a Call Session Control Function (CSCF) 120 and an IMS application server (IMS AS) 121.

When a SIP client registers with a HIGA, the HIGA assigns one of the IMPUs to the SIP client so that an IMS network can identify the SIP client through the HIGA. A B2BUA in the HIGA is responsible for converting a local SIP identity into the IMPU and vice versa. Accordingly, if the SIP clients 110, 111, and 112 register with the HIGA 100, the HIGA stores a mapping table in the device DB 102 as shown in FIG. 2. The B2BUA 101 handles IMS signaling on behalf of the SIP clients 110, 111, and 112 such that all signaling concerning respective SIP clients is associated with the corresponding IMPI on the ISIM application. For example, if the SIP client 110 sends a SIP Register message to the HIGA 100, the B2BUA 101 translates the message into an IMS REGISTER message that contains both the IMPI 161 and the IMPU 162 corresponding to the SIP client 110. Thus, the HIGA 100 acts as an IMS terminal on behalf of the SIP clients 110, 111, and 112, thereby enabling the SIP clients 110, 111, and 112 to access the IMS network 181.

The conventional HIGA succeeded in mediating communication between SIP clients and an IMS network over a Gm interface. Thus, the SIP clients such as a SIP phone and an instant messenger that are not IMS-enabled could communicate with the IMS network by way of the HIGA.

However, functionality of the conventional HIGA is not sufficient when the IMS AS, with which the SIP clients communicate, acts as a Generic Bootstrapping Architecture (GBA) Network Application Function (NAF), which as such is known to a person skilled in the art through e.g., "Generic Authentication Architecture (GAA); Generic bootstrapping architecture," 3GPP TS33.220 V7.3.0 (2006-03). One example of the IMS AS that also acts as a GBA NAF is an IP television (IPTV) AS. In this case, an IPTV client as a SIP client needs to access the IPTV AS not only over the Gm interface, but also over a Ua interface, which as such is known to a person skilled in the art through e.g., 3GPP TS24.109 V7.5.0. The Ua interface provides a secure authenticated channel, which is usually achieved using a Transport Layer Security (TLS) connection (sometimes with HTTP Digest authentication), between the IPTV client and the IPTV AS. The IPTV client can securely communicate with the IPTV AS over this TLS connection using an application protocol such as HTTP or RTSP.

FIG. 3 illustrates a situation where an IPTV client cannot communicate with an IPTV AS by way of the conventional HIGA. In FIG. 3, the same reference characters as in FIG. 1 designate the same or similar components as in FIG. 1, thus a description thereof will be omitted.

An IPTV client 300 includes SIP functionality 301 and an IPTV application 302. While the IPTV client 300 can make "indirect" access to an IPTV AS 310 that acts as a GBA NAF over a Gm interface via the B2BUA 101 of the HIGA 100, it cannot make access to the IPTV AS 310 over a Ua interface. In other words, while the SIP functionality 301 can communicate with the IPTV AS 310 via the HIGA 100, the IPTV application 302 cannot communicate with the IPTV AS 310 via the HIGA 100. This is because the IPTV client 300 does not have an ISIM application and thus cannot derive a NAF-specific key termed Ks_(ext/int)_NAF required to secure the Ua interface.

SUMMARY

The present invention is intended to address the above-described problem, and it is a feature thereof to introduce a technology that enables a client terminal, which is not IMS-enabled, to access an IMS AS over a Ua interface.

According to first aspect of the present invention, there is provided a multimedia gateway that has an ISIM, a first interface to communicate with a client terminal, and a second interface to communicate with an IMS AS that acts as a GBA NAF located in an IMS network. The multimedia gateway comprises: registering means for assigning an IMPU obtained from the ISIM to the client terminal in response to a registration request message received from the client terminal, and registering the IMPU assigned to the client terminal with the IMS network, request receiving means for receiving, from the client terminal, a request message that specifies a destination IMS AS and a communications protocol, and identifying the IMPU assigned to the client terminal, establishing means for establishing a session for communication with the IMS AS by means of the communications protocol, and establishing a connection with the IMS AS over the session, authentication information sending means for sending authentication information derived from the ISIM that contains the identified IMPU to the IMS AS, request sending means for sending the request message together with the identified IMPU to the IMS AS through the connection, response receiving means for receiving a response message from the IMS AS through the connection as a response to the request message, and response sending means for sending the response message to the client terminal.

In some embodiments, the establishing means determines whether or not the session is established if the request receiving means receives the request message, and establishes the session if it is determined that the session is not established.

In some embodiments, the establishing means stores a session identity that identifies the session in association with the destination IMS AS, the communications protocol, and the ISIM that contains the identified IMPU, and determines that the session is established if the session identity associated with the destination IMS AS, the communications protocol, and the ISIM that contains the identified IMPU, is stored.

In some embodiments, the establishing means determines whether or not the connection is established if the request receiving means receives the request message, and establishes the connection if it is determined that the connection is not established.

In some embodiments, the establishing means stores a connection identity that identifies the connection in association with the session identity and the identified IMPU, and determines that the connection is established if the connection identity associated with the session identity and the identified IMPU, is stored.

In some embodiments, the registering means assigns an address at which the request receiving means receives the request message from the client terminal, the address being unique to the client terminal, stores the address in association with the IMPU assigned to the client terminal, and notifies the client terminal of the address. Moreover, the request receiving means identifies the IMPU assigned to the client terminal based on association between the address and the IMPU.

In some embodiments, the registering means assigns a plurality of the addresses, each of which is associated with different communications protocols, stores the plurality of the addresses in association with the IMPU assigned to the client terminal, and notifies the client terminal of the plurality of the addresses.

In some embodiments, the registration request message specifies at least one communications protocol. Moreover, the registering means assigns a same number of the addresses as a number of the at least one communications protocol, each of which is associated with a different communications protocols, stores the same number of the addresses in association with the IMPU assigned to the client terminal, and notifies the client terminal of the same number of the addresses.

In some embodiments, the registering means stores a Universal Resource Identifier (URI) of the client terminal in association with the IMPU assigned to the client terminal, and the request receiving means identifies the IMPU assigned to the client terminal based on association between the URI included in the request message and the IMPU.

In some embodiments, the authentication information sending means sends the authentication information when the establishing means establishes the session.

In some embodiments, the authentication information sending means sends the authentication information upon request from the IMS AS after the establishing means establishes the connection.

In some embodiments, the client terminal is Session Initiation Protocol (SIP)-enabled and the registration request message is a SIP Register message.

In some embodiments, the request message is an HTTP Request message or an RTSP Request message.

In some embodiments, the session is a TLS session and the connection is a Transport Layer Security (TLS) connection.

According to second aspect of the present invention, there is provided a method of controlling a multimedia gateway that has an ISIM, a first interface to communicate with a client terminal, and a second interface to communicate with an IMS AS that acts as a GBA NAF located in an IMS network. The method comprises: assigning an IMPU obtained from the ISIM to the client terminal in response to a registration request message received from the client terminal, and registering the IMPU assigned to the client terminal with the IMS network, receiving, from the client terminal, a request message that specifies a destination IMS AS and a communications protocol, and identifying the IMPU assigned to the client terminal, establishing a session for communication with the IMS AS by means of the communications protocol, and establishing a connection with the IMS AS over the session, sending authentication information derived from the ISIM that contains the identified IMPU to the IMS AS, sending the request message together with the identified IMPU to the IMS AS through the connection, receiving a response message from the IMS AS through the connection as a response to the request message, and sending the response message to the client terminal.

In some embodiments, the method, in the step of establishing, determines whether or not the session is established if the request message is received in the step of receiving the request message, and establishes the session if it is determined that the session is not established.

In some embodiments, the method, in the step of establishing, stores a session identity that identifies the session in association with the destination IMS AS, the communications protocol, and the ISIM that contains the identified IMPU, and determines that the session is established if the session identity associated with the destination IMS AS, the communications protocol, and the ISIM that contains the identified IMPU, is stored.

In some embodiments, the method, in the step of establishing, determines whether or not the connection is established if the request message is received in the step of receiving the request message, and establishes the connection if it is determined that the connection is not established.

In some embodiments, the method, in the step of establishing stores a connection identity that identifies the connection in association with the session identity and the identified IMPU, and determines that the connection is established if the connection identity associated with the session identity and the identified IMPU, is stored.

In some embodiments, the method, in the step of assigning and registering, assigns an address at which the request message is received from the client terminal in the step of receiving the request message, said address being unique to the client terminal, stores the address in association with the IMPU assigned to the client terminal, and notifies the client terminal of the address. Moreover, the method, in the step of receiving the request message, identifies the IMPU assigned to the client terminal based on association between the address and the IMPU.

In some embodiments, the method, in the step of assigning and registering, assigns a plurality of the addresses, each of which is associated with different communications protocols, stores the plurality of the addresses in association with the IMPU assigned to the client terminal, and notifies the client terminal of the plurality of the addresses.

In some embodiments, the registration request message specifies at least one communications protocol. Moreover, the method, in the step of assigning and registering, assigns a same number of the addresses as a number of the at least one communications protocol, each of which is associated with a different communications protocols, stores the same number of the addresses in association with the IMPU assigned to the client terminal, and notifies the client terminal of the same number of the addresses.

In some embodiments, the method stores a URI of the client terminal in association with the IMPU assigned to the client terminal in the step of assigning and registering. Moreover, the method identifies the IMPU assigned to the client terminal based on association between the URI included in the request message and the IMPU in the step of receiving the request message.

In some embodiments, the method, in the step of sending the authentication information, sends the authentication information when the session is established in the step of establishing.

In some embodiments, the method, in the step of sending the authentication information, sends the authentication information upon request from the IMS AS after the connection is established in the step of establishing.

In some embodiments, the client terminal is SIP-enabled and the registration request message is a SIP Register message.

In some embodiments, the request message is an HTTP Request message or an RTSP Request message.

In some embodiments, the session is a TLS session and the connection is a TLS connection.

The main advantage of the present invention is as follows. The multimedia gateway enables client terminals that are not IMS-enabled to communicate with an IMS AS that acts as a GBA NAF over a Ua interface. It should be noted that although the present invention is particularly advantageous when the client terminal is not IMS-enabled, a client terminal that is IMS-enabled is also able to communicate with the IMS AS via the multimedia gateway.

Further features of the present invention will become apparent from the following description of exemplary embodiments with reference to the attached drawings, in which like reference characters designate the same or similar parts throughout the figures thereof.

BRIEF DESCRIPTION OF DRAWINGS

FIG. 8 shows an example XML document returned along with the 200 OK response from the HIGA to the IPTV client according to some embodiments of the present invention;

FIG. 13 is a flowchart illustrating a procedure where the establishing unit of the HIGA establishes a TLS session and a TLS connection according to some embodiments of the present invention; and FIG. 14 is a sequence diagram illustrating a procedure where the HIGA with the TLS session/connection management function handles request messages and response messages according to some embodiments of the present invention.

DETAILED DESCRIPTION

Embodiments of the present invention will now be described with reference to the attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are always indispensable for the present invention.

Figure 3:
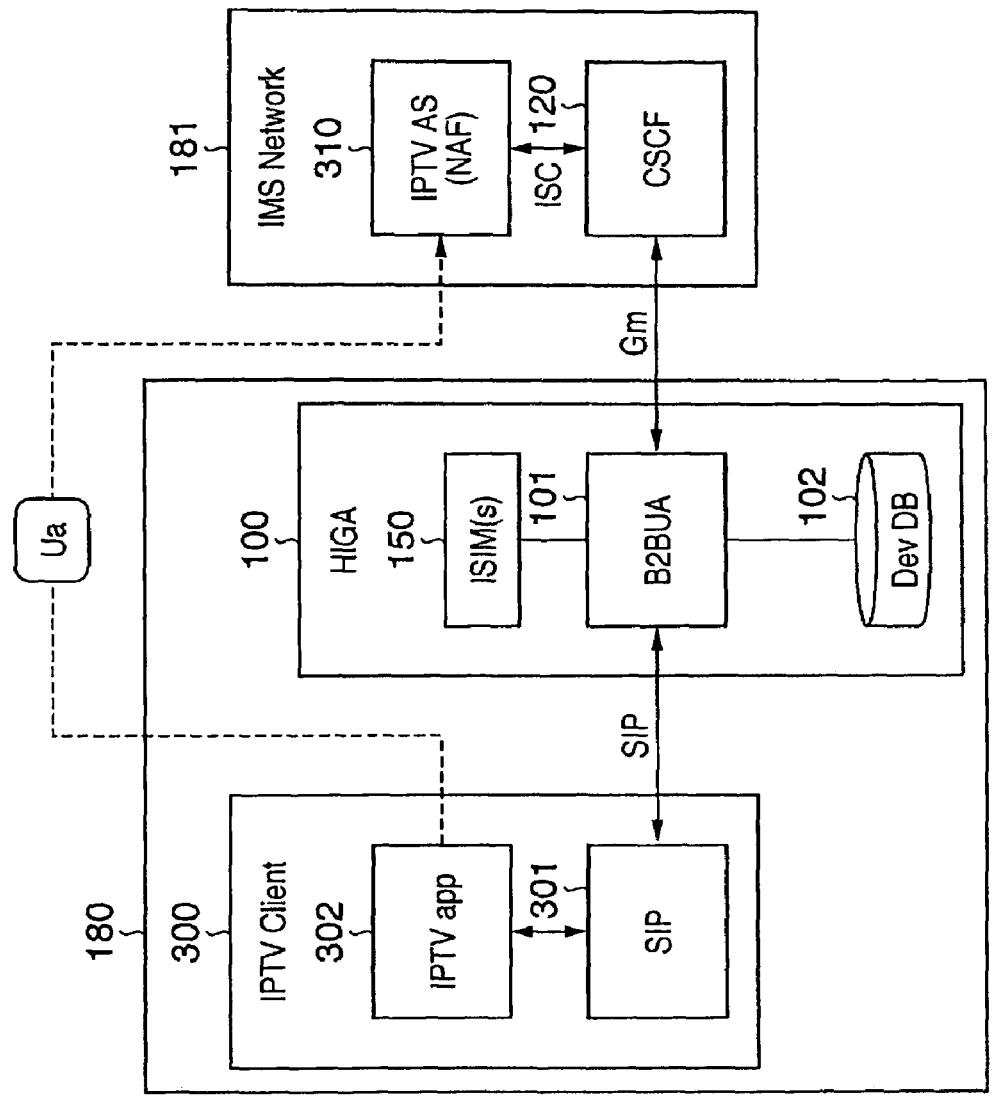
FIG. 3 illustrates a situation where an IP television (IPTV) client cannot communicate with an IPTV AS by way of the conventional HIGA.
Figure 4:
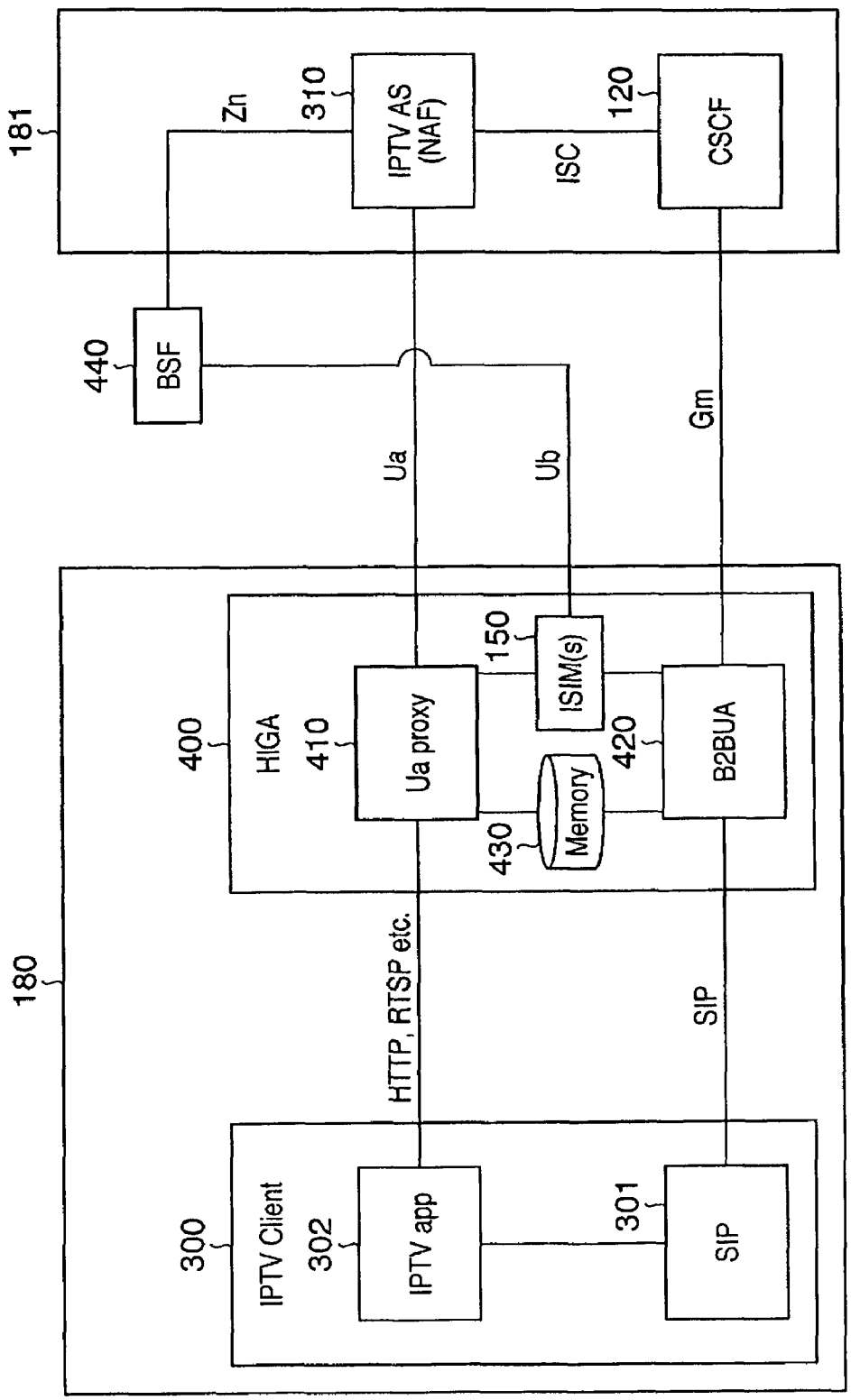
FIG. 4 illustrates the overall architecture of the exemplary embodiment of the present invention.

FIG. 4 illustrates the overall architecture of the exemplary embodiment of the present invention. In FIG. 4, the same reference characters as in FIG. 3 designate the same or similar components as in FIG. 3, thus the description thereof will be omitted.

Figure 1:
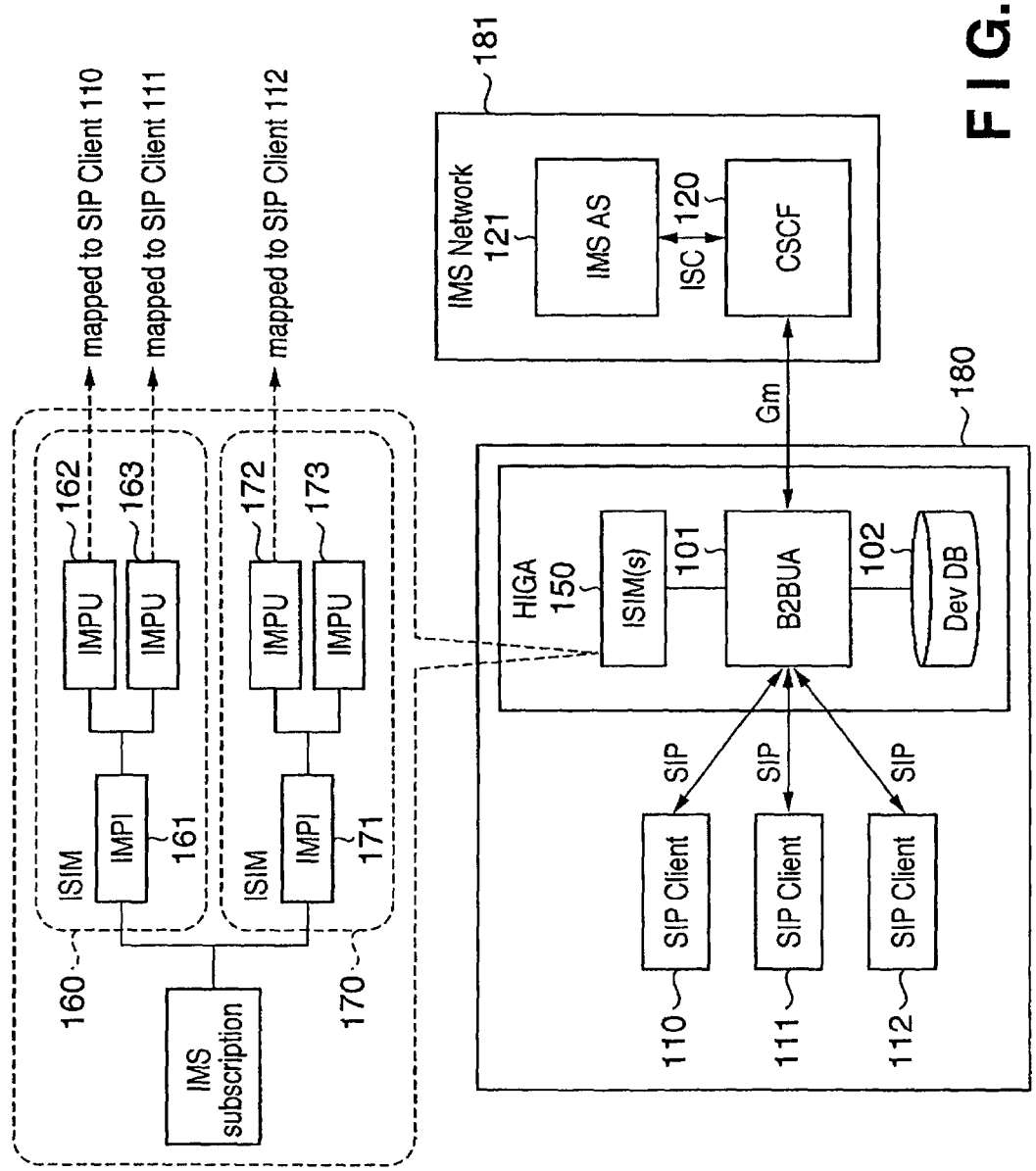
FIG. 1 schematically illustrates the structure of a Home IMS Gateway (HIGA) known in the art.
Figure 2:
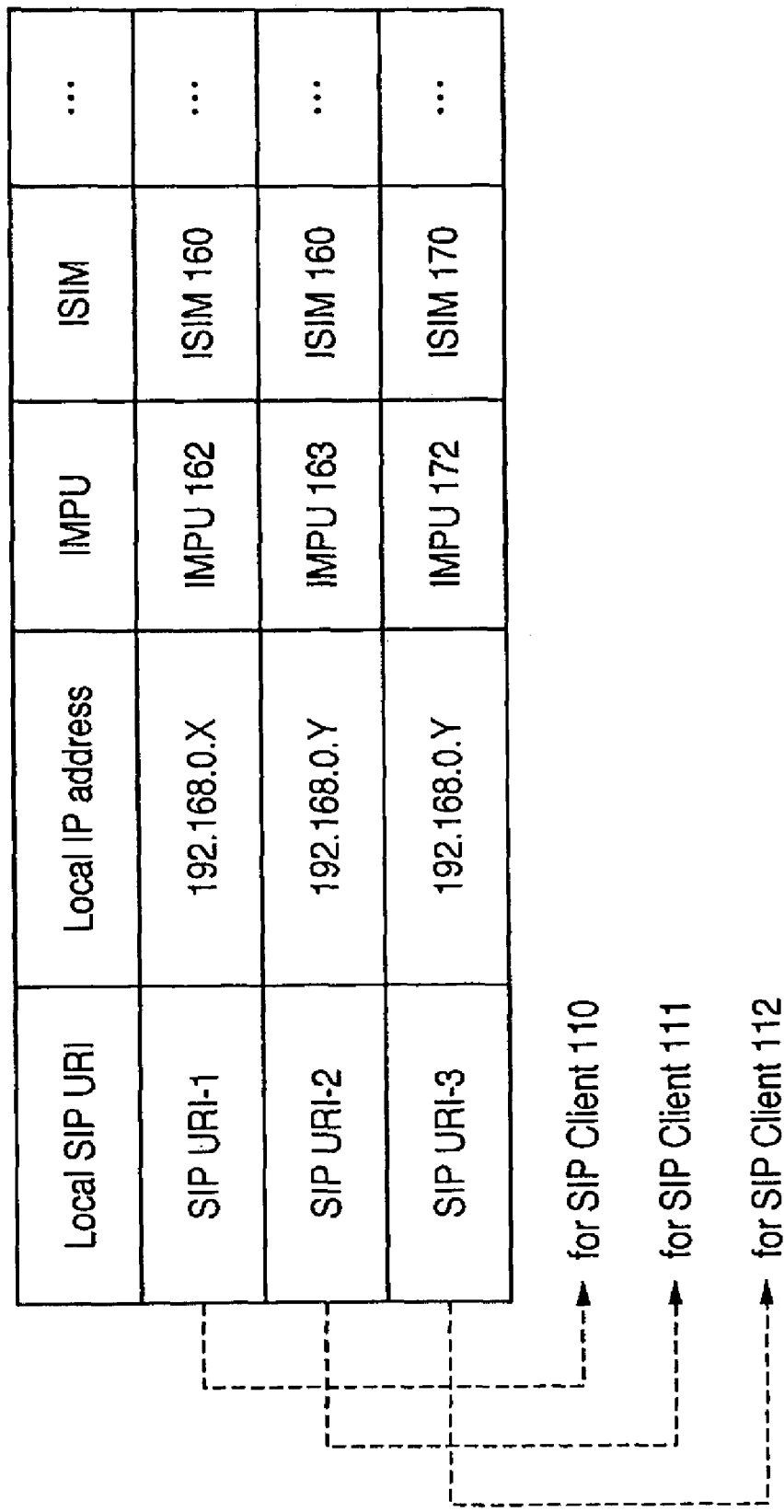
FIG. 2 illustrates an example of a mapping table that maintains a mapping between SIP clients and IMPUs.

In this embodiment, a HIGA 400 that comprises Ua proxy 410 is provided. The Ua proxy 410 mediates communication between the IPTV application 302 and the IPTV AS 310 over the Ua interface. Accordingly, the IPTV client 300 as a client terminal that is not IMS-enabled can communicate with the IPTV AS 310 as an IMS AS that acts as a GBA NAF over the Ua interface via the HIGA 400. Although FIG. 4 shows only one IPTV client 300 for the sake of simplicity, the HIGA 400 can support multiple IPTV clients simultaneously. The HIGA 400 also comprises a B2BUA 420, and a memory 430 that stores, for example, a mapping table shown in FIG. 2.

Bootstrap Server Function (BSF) 440 is hosted by a network operator of the IMS network 181. A Ub interface, which as such is known to a person skilled in the art through e.g., 3GPP TS22.109 V7.5.0, provides mutual authentication and shared key establishment between the BSF 440 and the HIGA 400 by running the bootstrap procedure defined in 3GPP TS33.220 V7.3.0 (2006-03). The shared key generated during the bootstrap can be afterwards applied for establishing a secure authenticated channel between a NAF such as the IPTV AS 310 and the HIGA 400.

Figure 5:
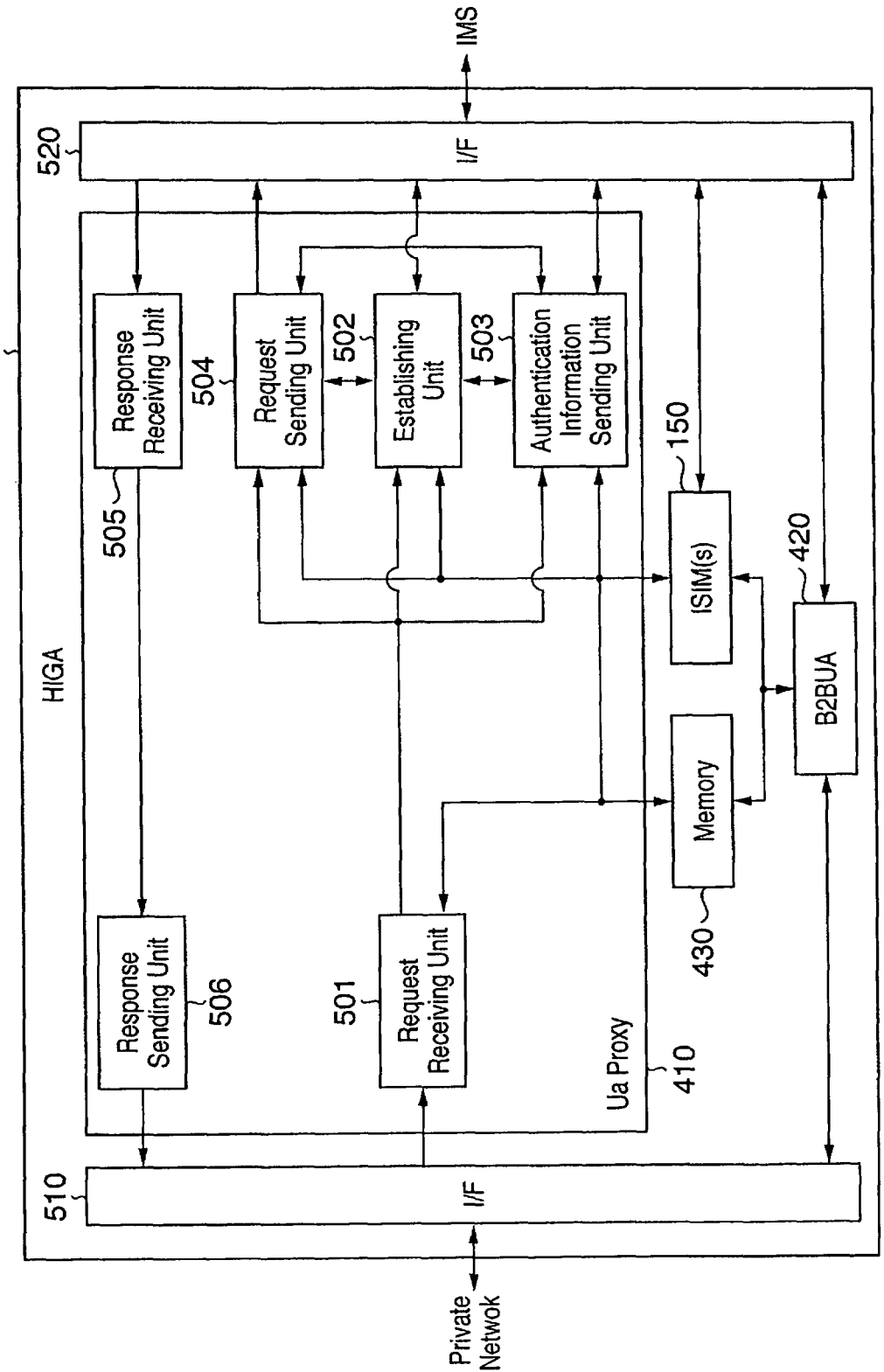
FIG. 5 is a block diagram illustrating a detailed configuration of the HIGA according to the exemplary embodiment of the present invention.

FIG. 5 is a block diagram illustrating a detailed configuration of the HIGA 400 according to the exemplary embodiment of the present invention.

The HIGA 400 comprises an interface 510 to communicate with the IPTV client 300 in the private network 180, and an interface 520 to communicate with the IMS network 181. The interfaces 510 and 520 are physically implemented by, for example, an Ethernet interface or wireless interfaces in conformity with such as IEEE802.11a/b/g. Logical interfaces such as the Ua interface and the Gm interface may be implemented over the interface 520.

When the B2BUA 420 receives a registration request message such as a SIP Register message from the IPTV client 300, the B2BUA 420 obtains an IMPU from one of the ISIMs 150 and assigns the IMPU to the IPTV client 300. The B2BUA 420 stores the association between the IMPU and the IPTV client 300 in the memory 430. Then, the B2BUA 420 registers the IMPU with the IMS network 181. Note that the functionality of the B2BUA 420 may be implemented by dedicated hardware, software executed by a processor (not shown) or a combination thereof.

The Ua proxy 410 comprises a request receiving unit 501, an establishing unit 502, an authentication information sending unit 503, a request sending unit 504, a response receiving unit 505, and a response sending unit 506. Note that each unit may be implemented by dedicated hardware, software executed by a processor (not shown) or a combination thereof.

The request receiving unit 501 receives a request message such as an HTTP Request message or an RTSP Request message from the IPTV client 300. The request message specifies a destination IMS AS (i.e., the IPTV AS 310 in this embodiment) and a communications protocol. The request receiving unit 501 identifies the IMPU assigned to the originating IPTV client 300 by referring to the mapping table in the memory 430.

The establishing unit 502 establishes a session such as a TLS session with the IPTV AS 310 and a connection such as a TLS connection with the IPTV AS 310 such that the Ua proxy can communicate with the IPTV AS 310 through the connection. Hereinafter, it is assumed that the session is the TLS session and the connection is the TLS connection.

Note that, in the present application, a TLS "session" represents a logical security association between the Ua proxy and the GBA NAF established by TLS Handshake protocol. The Ua proxy can identify each TLS session with a TLS session identifier defined in RFC 2246. On the other hand, a TLS "connection" represents an actual transport channel encrypted by TLS Record protocol defined in RFC 2246. The Ua proxy can identify each of its TLS connections through a TLS programming API such as an "SSL" object in OpenSSL API, which is known from http://www.openssl.org/.

The authentication information sending unit 503 sends authentication information to enable the IPTV AS 310 to authenticate the Ua proxy 410. More specifically, as one example out of possible solutions, the authentication information sending unit 503 may perform HTTP Digest authentication, which is defined in RFC 2617, toward the IPTV AS 310 after the TLS session is established. This procedure is specified in section 5.3 of 3GPP TS 33.222 V7.1.0 (2006-03). In this case, the TLS session is established by using a server certificate of the IPTV AS 310 first, and then the IPTV AS 310 authenticates the Ua proxy 410 via HTTP Digest by using the shared key "Ks_(ext)_NAF" derived from the ISIM as a password. Note that the master key of the Ks_(ext)_NAF is generated during the bootstrap procedure defined in the Ub interface. As another example, the authentication information sending unit 503 may perform mutual authentication with the IPTV AS 310 based on the shared key Ks_(ext)_NAF. The Ks_(ext)_NAF is used as a master key to generate TLS session keys. In this case, the Ua proxy 410 and the IPTV AS 310 authenticate each other when establishing the TLS session. This procedure is specified in section 5.4 of 3GPP TS 33.222 V7.1.0 (2006-03).

The request sending unit 504 sends the received request message together with the identified IMPU to the IPTV AS 310 through the TLS connection.

The response receiving unit 505 receives a response message from the IPTV AS 310 through the TLS connection as a response to the request message sent by the request sending unit 504.

The response sending unit 506 sends the response message to the IPTV client 300. Thus, the IPTV client 300 can send the request message to the IPTV AS 310 and receives the response message from the IPTV AS 310 over the Ua interface via the HIGA 400.

Figure 6:
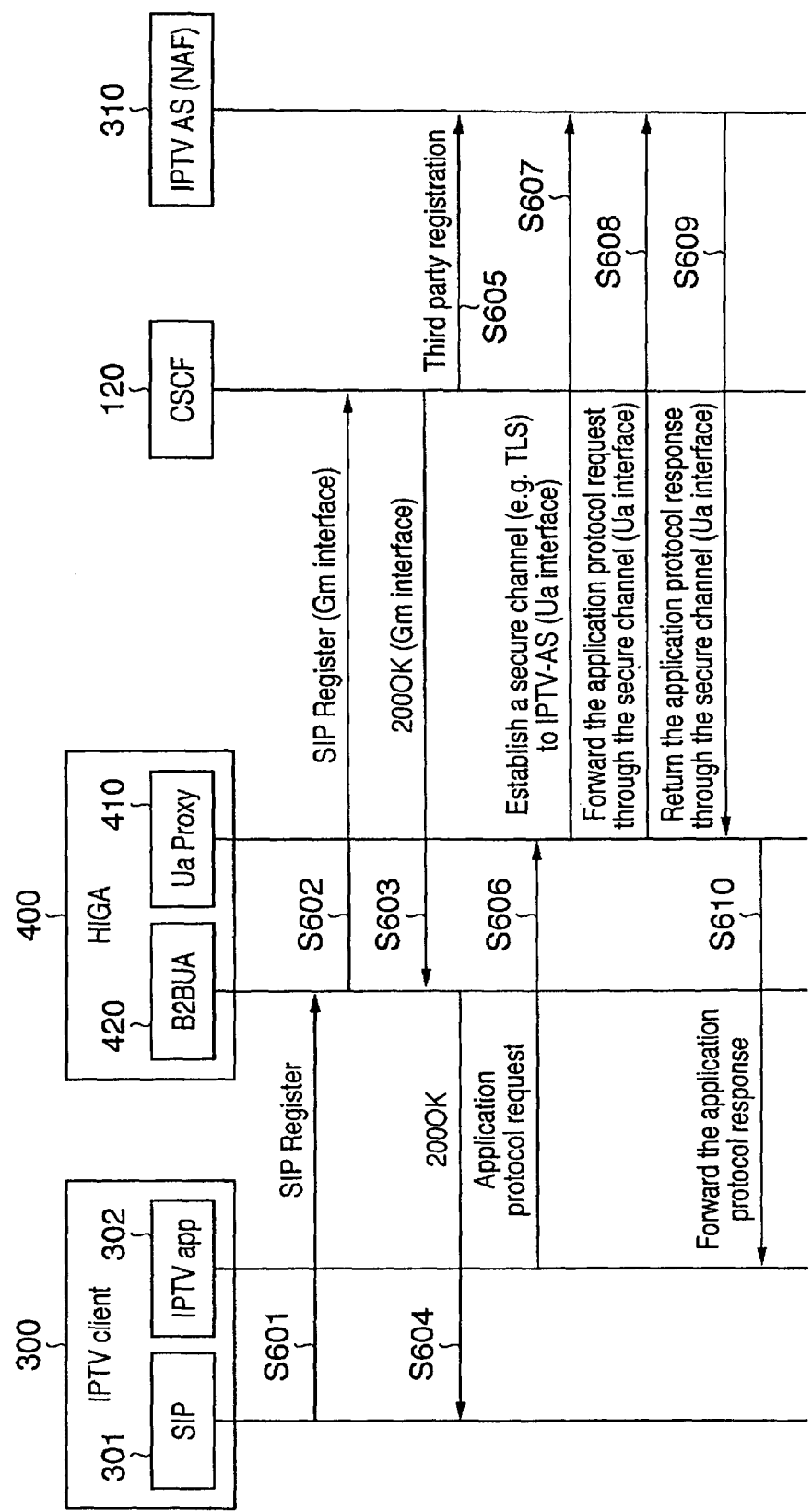
FIG. 6 is a sequence diagram illustrating a procedure where the HIGA mediates communication between an IPTV client and an IP Multimedia Subsystem (IMS) network according to the exemplary embodiment of the present invention.

FIG. 6 is a sequence diagram illustrating a procedure where the HIGA 400 mediates communication between the IPTV client 300 and the IMS network 181. In this sequence diagram it is assumed that the IPTV client 300 knows the addresses of the B2BUA 420 and the Ua proxy 410 in advance. For example, the IPTV client 300 may discover the HIGA 400 by means of Universal Plug and Play (UPnP) technology, and the HIGA 400 informs the IPTV client 300 of the addresses through the communication based on UPnP technology. It should be noted that mechanisms other than UPnP such as Bluetooth and Bonjour may also be used to enable the IPTV client 300 to discover the HIGA 400.

In step S601, the SIP functionality 301 registers the IPTV client 300 with the HIGA 400 by sending a SIP Register message to the B2BUA 420.

In step S602, the B2BUA 420 assigns an IMPU obtained from the ISIMs 150 and stores the association between the IMPU and the IPTV client 300 in the memory 430. Then, the B2BUA 420 registers the assigned IMPU with the IMS network 181 by sending a SIP Register message to the CSCF 120 over the Gm interface.

In step S603, the B2BUA 420 receives a successful response (a 200 OK response) from the CSCF 120 over the Gm interface.

In step S604, the B2BUA 420 sends a 200 OK response to the SIP functionality 301, thereby the IPTV client 300 recognizes that it is successfully registered in the B2BUA 420.

In step S605, the CSCF 120 performs third party registration to the IPTV AS 310 to notify the IPTV AS 310 that the IMPU has been registered.

In step S606, the IPTV application 302 sends an application protocol request message (e.g., an HTTP Request message) to the Ua proxy 410. The Ua proxy 410 identifies the IMPU assigned to the IPTV client 300 based on the association stored in step S602.

In step S607, the Ua proxy 410 establishes a TLS session with the IPTV AS 310 and establishes a TLS connection with the IPTV AS 310 over the TLS session according to GBA specification (for the detail of GBA specification, please refer to "Bootstrap interface (Ub) and network application function interface (Ua); Protocol details," 3GPP TS24.109 V7.5.0 (2006-12)). In some embodiments, HTTP Digest authentication may be performed following the establishment of the TLS session/connection as specified by GBA. As a result, the IPTV AS authenticates the Ua proxy 410.

In step S608, the Ua proxy 410 sends the request message received in step S606 to the IPTV AS 310 through the TLS connection over the Ua interface by encapsulating the request message into the TLS connection. In this step, the Ua proxy 410 also sends the IMPU assigned to the IPTV client 300 by inserting an X-3GPP-Intended-Identity header with the IMPU into the request message.

In step S609, the Ua proxy 410 receives a response message from the IPTV AS 310 through the TLS connection over the Ua interface.

In step S610, the Ua proxy 410 decapsulate the response message received from the TLS connection in step S609, and sends the response message to the IPTV application 302.

In some embodiments, the HIGA 400 may further be equipped with the following functions that enhance performance of the HIGA 400.
Ua proxy address advertisement function
Identity mapping function
TLS session/connection management function
(Ua Proxy Address Advertisement Function)
As described above, the Ua proxy 410 can notify the IPTV client 300 of the address (IP address and TCP port) to which the IPTV application 302 sends the request message according to, for example, UPnP technology. However, in this alternative embodiment, the Ua proxy 410 notifies the IPTV client 300 of the address by utilizing a response to the SIP Register message.

Figure 7:
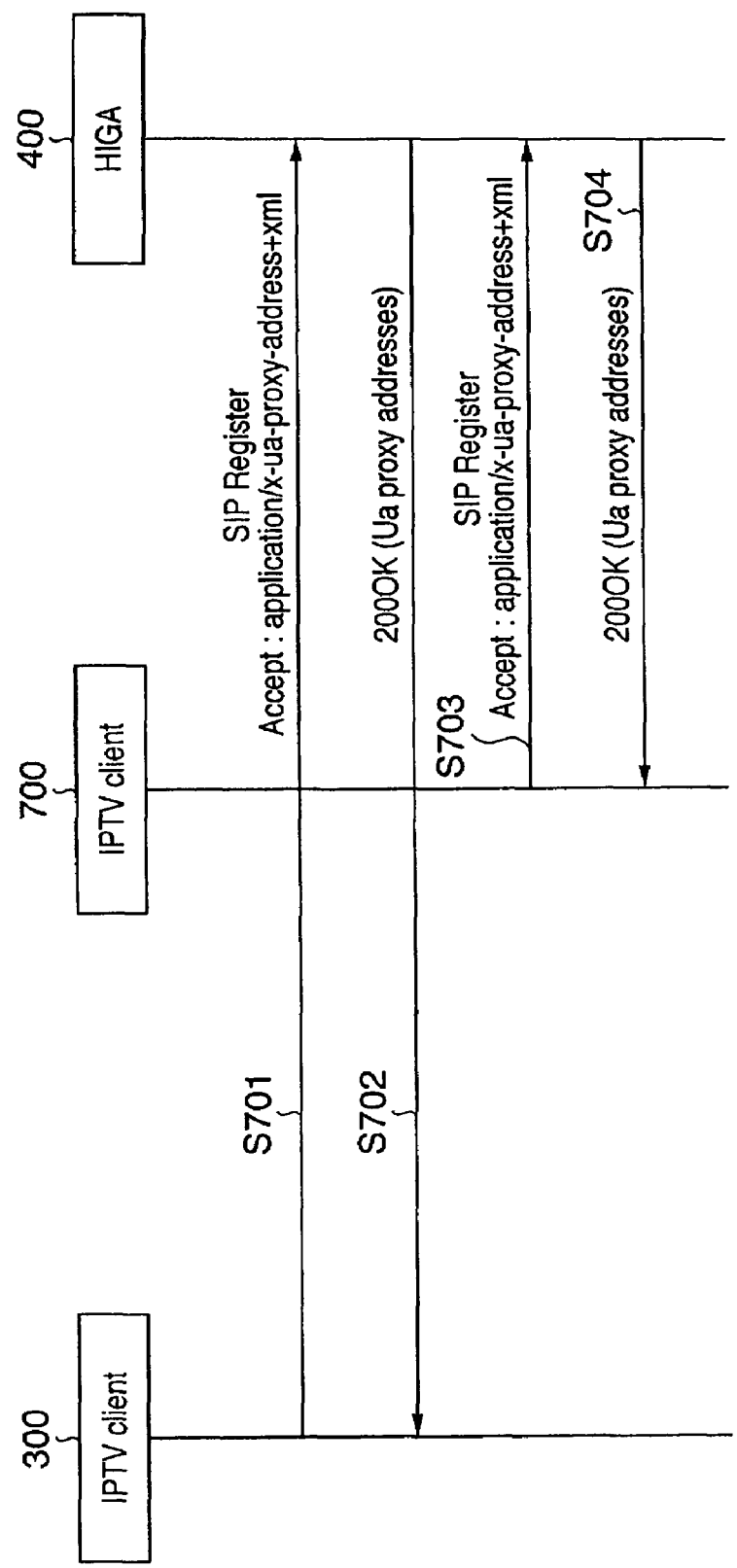
FIG. 7 is a sequence diagram illustrating a procedure where the HIGA notifies IPTV clients of the address of the Ua proxy according to some embodiments of the present invention.

FIG. 7 is a sequence diagram illustrating a procedure where the HIGA 400 notifies IPTV clients of the address of the Ua proxy 410.

As shown in step S701 of FIG. 7, the IPTV client 300 specifies a MIME type of "application/x-ua-proxy-address+xml" in an Accept header in a SIP Register message. When the B2BUA 420 of the HIGA 400 receives this SIP Register message, as shown in step S702, it understands that the client is requesting the Ua proxy function and thus returns a 200 OK response with an XML document that lists Ua proxy addresses. As shown in steps S703 and S704, another IPTV client 700 may obtain the addresses in the same way as the IPTV client 300.

FIG. 8 shows an example XML document returned along with the 200 OK response. It contains a list of the addresses where the Ua proxy 410 is listening to application protocol requests to be mediated.

Each <Addr> element contains an address (IP address:TCP port) of the Ua proxy and each address is distinguishable by "scheme" attribute. This attribute specifies what scheme of application protocol requests can be accepted by the Ua proxy 410 on the specified address. Examples of schemes are HTTP and RTSP.

Figure 9:
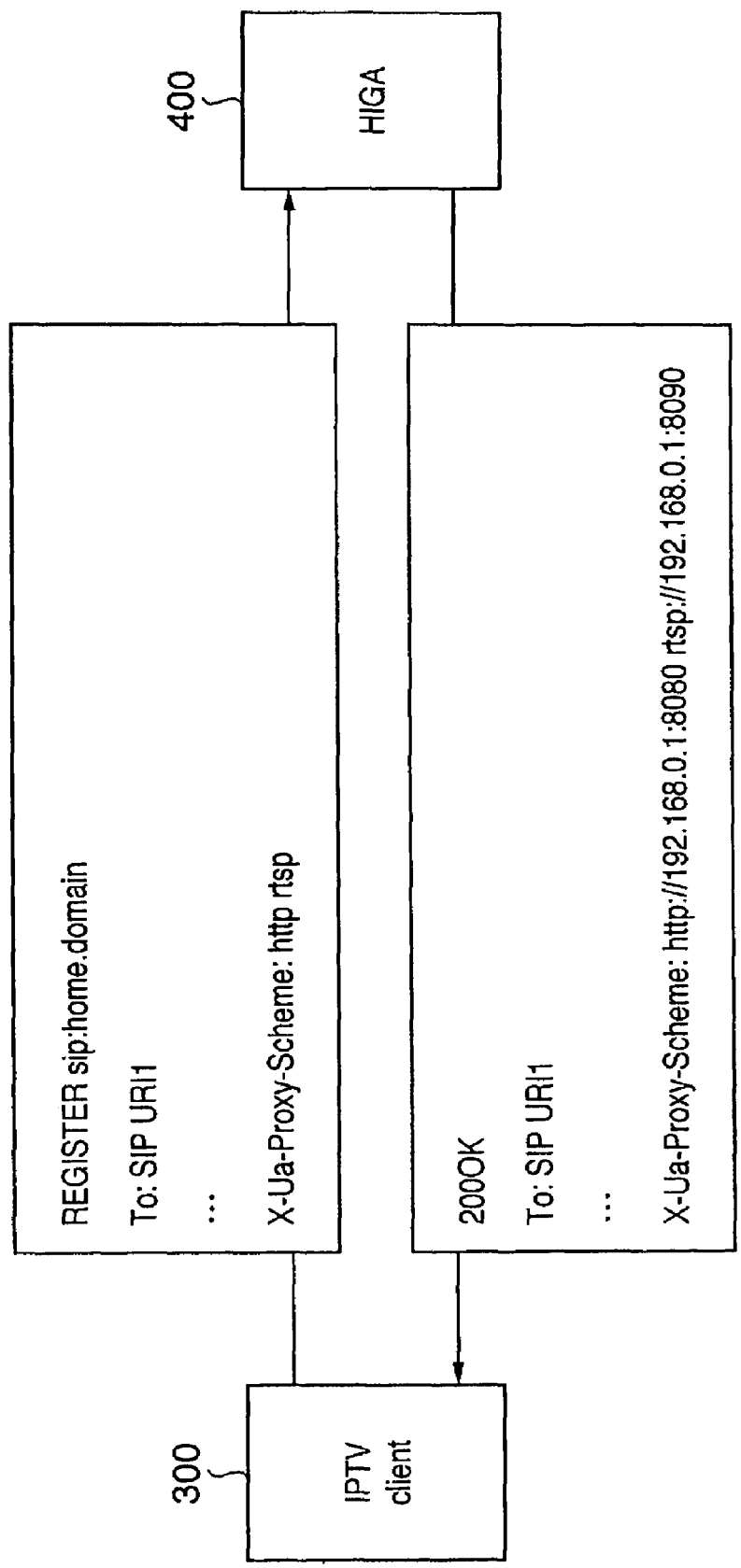
FIG. 9 illustrates a procedure where the HIGA notifies IPTV clients of the address of the Ua proxy according to another embodiment of the present invention.

In another embodiment, as shown in FIG. 9, the IPTV client 300 adds an extension header (e.g., "X-Ua-Proxy-Scheme") to the SIP Register message. The header field contains a list of schemes (e.g., http, rtsp) for which the IPTV client 300 asks the HIGA 400 to provide the addresses of the Ua proxy 410. The HIGA 400 then returns a list of the addresses of the Ua proxy 410 for each scheme by an extension header (e.g. "X-Ua-Proxy-Address") carried within the 200 OK response. The advantage of this embodiment is that the IPTV client 300 can request the addresses of the Ua proxy 410 for a specific scheme. If the IPTV client 300 desires, for example, to use an HTTP scheme but does not desire to use an RTSP scheme, it will request only a Ua proxy address for HTTP scheme.

It is preferable that unique addresses be provided to respective IPTV clients. In this case, the Ua proxy 410 can effectively identify the IMPU assigned to the IPTV client from which the request message is received. This will be described in detail in connection with the "Identity mapping function" in the next section.

It should be noted that it is not mandatory for the HIGA 400 to assign different addresses for different communications protocols (i.e., scheme).

Figure 10:
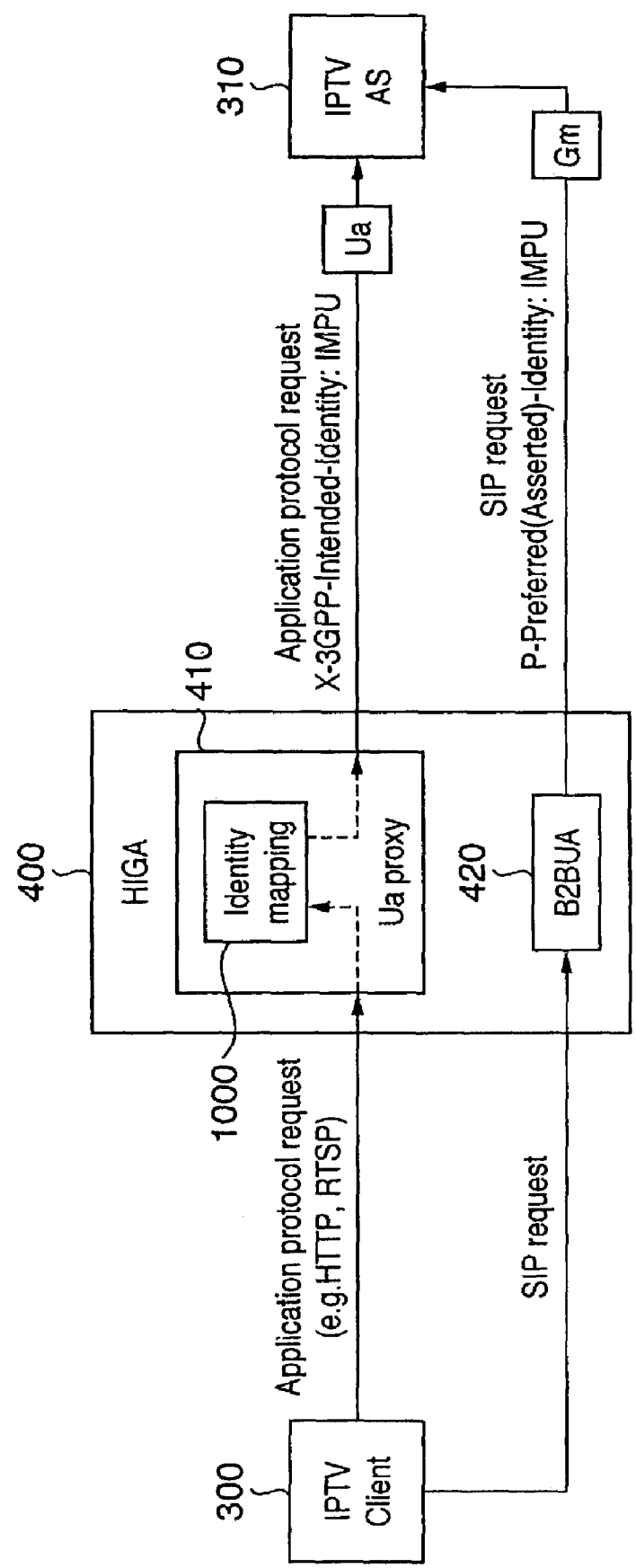
FIG. 10 schematically illustrates an identity mapping function of the HIGA according to some embodiments of the present invention.

(Identity Mapping Function)
As described above, when the Ua proxy 410 forwards application protocol requests (e.g., HTTP or RTSP Request messages) to the IPTV AS 310, it inserts an X-3GPP-Intended-Identity header into every request message. The header is filled with an IMPU that has been assigned to the requesting IPTV client by Ua proxy 410. This enables the IPTV AS 310 to identify the requesting IPTV client even when the IPTV AS 310 is communicating with the IPTV client via the HIGA 400 over Ua interface (refer to FIG. 7). An identity mapping function 1000 in FIG. 10 may be implemented by the combination of the request receiving unit 501, the B2BUA 420, and the memory 430 in FIG. 5.

One possible mechanism for the identity mapping function is one which compares the IP address of a requesting IPTV client, which is obtained as the source IP address from the corresponding application protocol request to the mapping table (refer to FIG. 2) stored in the memory 430 by the B2BUA 420. The Ua proxy 410 will consequently identify the IMPU assigned to that IP address.

However, this mechanism may not work correctly if multiple IMPUs are assigned a single IP address, for example when multiple IPTV clients are equipped in a single device. The following two mechanisms can address such cases.

(1) Advertise Unique Ua Proxy Addresses to each IPTV Client

This mechanism relates to the issue described in the end of the previous section. That is, unique addresses are provided to the respective IPTV clients. More specifically, when the B2BUA 420 receives a SIP Register message from an IPTV client, the B2BUA 420 advertises TCP ports (e.g., for HTTP and RTSP schemes respectively) that are individually (i.e., uniquely) assigned to this IPTV client. The B2BUA 420 then creates a mapping table that maps the TCP ports to the IMPU just assigned to the IPTV client. In other words, the B2BUA 420 assigns a unique address to the IPTV client, stores the assigned address in association with the assigned IMPU in the memory 430, and notifies of the assigned address. Then, if (the request receiving unit 501 of) the Ua proxy 410 receives application protocol requests at a specific address, it refers to the mapping table stored in the memory 430, and identifies the IMPU associated with that specific address.

(2) Mandate that IPTV Clients Insert their Local SIP URI into Application Protocol Requests With this solution, each IPTV client is required to insert its local SIP URI into every application protocol request as, for example, an extension header field to HTTP/RTSP. Since the HIGA 400 has a mapping table (refer to FIG. 2) that can translate the local SIP URI to the IMPU, the Ua proxy 410 can identify the IMPU assigned to the requesting IPTV client.

(TLS Session/Connection Management Function)
The Ua proxy 410 may maintain multiple TLS sessions and connections for serving multiple IPTV clients. To manage the multiple TLS sessions and connections, the establishing unit 502 of the Ua proxy 410 is equipped with a TLS session/connection management function.

Figure 11A:
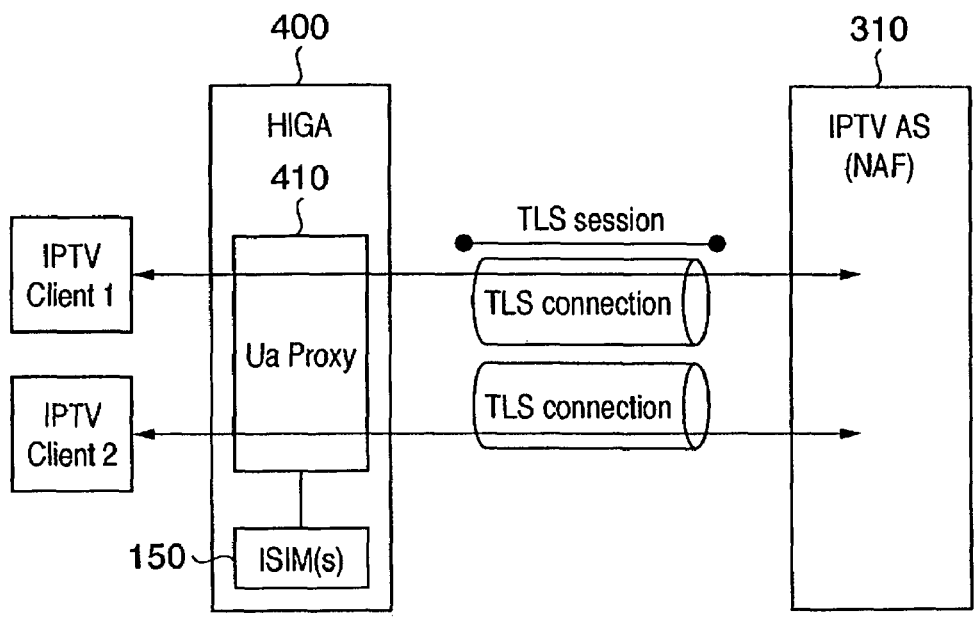
FIG. 11A schematically illustrates a situation where two IPTV clients share a single TLS session.
Figure 11B:
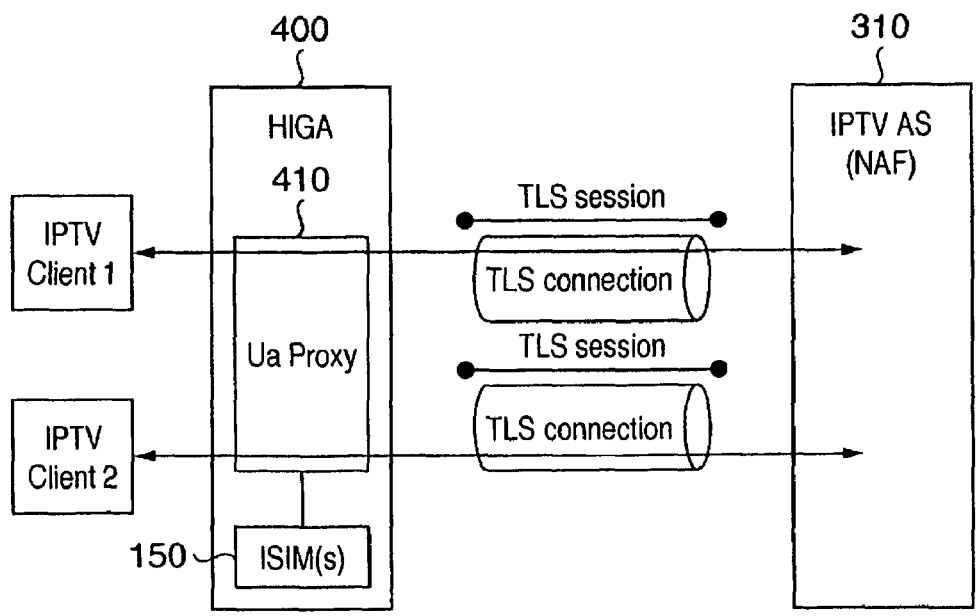
FIG. 11B schematically illustrates a situation where a TLS session is established per IPTV client.

This function enables the Ua proxy 410 to establish TLS sessions more efficiently by reducing the number of TLS sessions established through sharing of existing TLS sessions with multiple IPTV clients as much as possible. This situation will be better understood when comparing FIG. 11A where two IPTV clients share a single TLS session with FIG. 11B where a TLS session is established per IPTV client.

Sharing a TLS session by multiple IPTV clients is advantageous because establishment of a TLS session requires heavy cryptographic operations and a number of message exchanges during TLS handshake, which are costly.

According to the TLS session/connection management function, if the request receiving unit 501 (refer to FIG. 5) receives a request message, the establishing unit 502 determines whether or not a TLS session usable for the received request message has been established. If a usable TLS session has been established, the establishing unit 502 reuses the established TLS session; otherwise, it establishes a new TLS session.

Moreover, the establishing unit 502 reuses the established TLS connection if possible. More specifically, if the request receiving unit 501 receives a request message, the establishing unit 502 determines whether or not a TLS connection usable for the received request message is established. If a usable TLS connection is established, the establishing unit 502 reuses the established TLS connection; otherwise, it establishes a new TLS connection.

Figure 12:
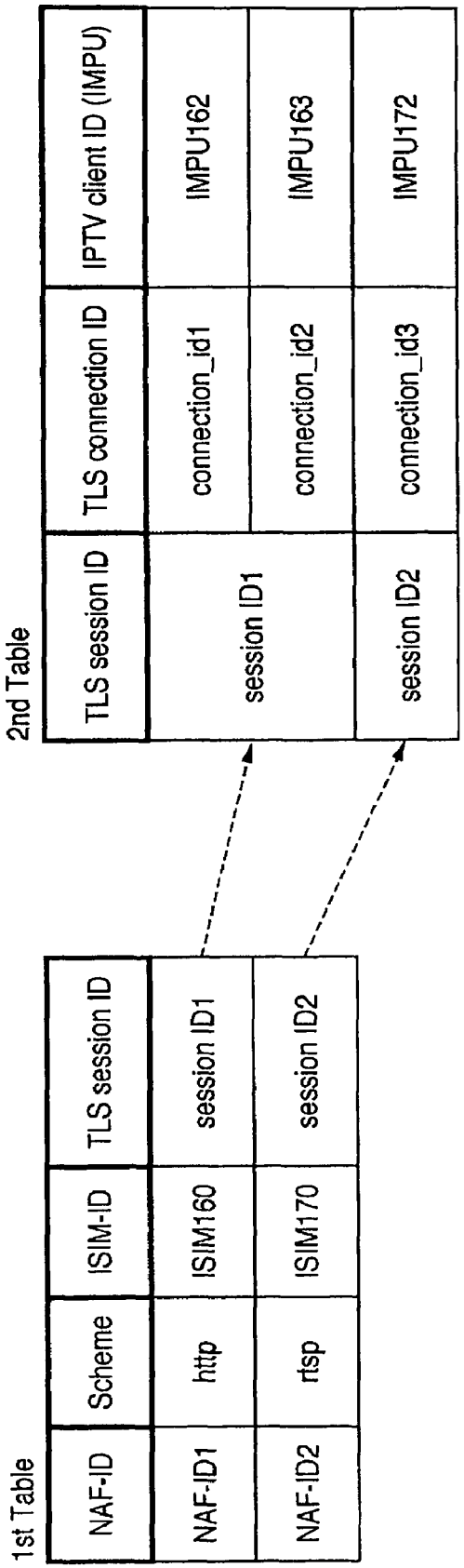
FIG. 12 illustrates an example of the session/connection management table maintained by an establishing unit of the HIGA according to some embodiments of the present invention.

In some embodiments, the establishing unit 502 maintains a session/connection management table in the memory 430. FIG. 12 illustrates an example of the session/connection management table.

As shown in FIG. 12, the session/connection management table comprises two tables. The first table comprises a TLS session identity (ID) that identifies the established TLS session, and three attributes (NAF-ID, scheme, ISIM-ID) of each TLS session. NAF-ID indicates, for example, a Fully Qualified Domain Name (FQDN), which identifies the destination IMS AS. Each TLS session further points to an entry in the second table, where TLS connections that are sharing the same TLS session are maintained.

When the establishing unit 502 establishes a TLS session, it stores the TLS session ID in association with the NAF-ID, the scheme (communications protocol), and the ISIM-ID in the first table. The stored ISIM-ID identifies the ISIM that contains the IMPU identified by the request receiving unit 501. When the establishing unit 502 establishes a TLS connection, it stores the TLS connection ID that identifies the established TLS connection in association with the TLS session ID and the IMPU identified by the request receiving unit 501.

When the request receiving unit 501 receives a request message, the establishing unit 502 can determine that a TLS session usable for the request message has been established (i.e., exists) if the TLS session ID associated with the NAF-ID and scheme specified in the request, and the ISIM-ID identified by the request receiving unit 501, is stored in the first table. If a usable TLS session exists, the establishing unit 502 refers to the second table, and it can determine that a TLS connection usable for the request message has been established (i.e., exists) if the TLS connection ID associated with the TLS session ID and the IMPU identified by the request receiving unit 501, is stored in the second table.

FIG. 13 is a flowchart illustrating a procedure where the establishing unit 502 establishes a TLS session and a TLS connection. When the receiving unit 501 receives a request message, the establishing unit 502 executes the procedure of FIG. 13. In step S1301, the receiving unit 501 identifies an IMPU assigned to the requesting IPTV client, and an ISIM that contains the identified IMPU. The receiving unit 501 informs the establishing unit 502 of the IMPU-ID and ISIM-ID of the identified IMPU and ISIM. The receiving unit 501 performs the identification in this step based on the address at which the request message is received and the contents of the mapping table stored in the memory 430.

In step S1302, the receiving unit 501 identifies the NAF-ID and the scheme specified in the request message, and notifies the establishing unit 502 of the identified NAF-ID and scheme. The NAF-ID is, for example, specified in a "Host" header field of the request message.

In step S1303, the establishing unit 502 searches the session/connection management table stored in the memory 430 for an entry that matches the notified NAF-ID, scheme, and ISIM-ID. If the entry is found, the process proceeds to step S1304; otherwise the process proceeds to step S1307.

In step S1304, the establishing unit 502 searches the session/connection management table for an entry that matches the notified IMPU-ID and the TLS session ID of the entry located in step S1303. If a matching entry is found, the process proceeds to step S1305; otherwise the process proceeds to step S1306. In step S1305, the establishing unit 502 decides to reuse the established TLS connection identified by the TLS connection ID of the entry located in step S1304.

In step S1306, the establishing unit 502 establishes a new TLS connection on the established TLS session identified by the TLS session ID of the entry located in step S1303. The establishing unit 502 generates a TLS connection ID that identifies the established TLS connection, and adds a new entry including the TLS connection ID and the identified IMPU-ID in the second table of the session/connection management table.

In step S1307, the establishing unit 502 establishes a new TLS session for the specified scheme. The establishing unit 502 generates a TLS session ID that identifies the established TLS session, and adds a new entry including the TLS session ID, and the identified NAF-ID, scheme, and ISIM-ID in the first table of the session/connection management table. In some embodiments, when establishing the TLS session, the establishing unit 502 (in connection with the authentication information sending unit 503) may use the Ks_(ext/int)_NAF derived from the ISIM identified in step S1301.

In step S1308, the establishing unit 502 establishes a new TLS connection on the established session in step S1307. The establishing unit 502 generates a TLS connection ID that identifies the established TLS connection, and adds a new entry including the TLS connection ID and the identified IMPU-ID in the second table of the session/connection management table.

Note that there may be a NAF (i.e., IPTV AS) that declines to share a single TLS session with multiple TLS connections for multiple IPTV clients because of some reasons. In such cases, the TLS session would be newly established for each TLS connection. When the Ua proxy 410 encounters this kind of NAF which rejects the TLS session sharing, the Ua proxy 410 remembers this NAF and will not attempt to share a TLS session with this NAF next time.

Example Procedure

FIG. 14 is a sequence diagram illustrating a procedure where the HIGA 400 with the TLS session/connection management function handles request messages and response messages. In FIG. 14, it is assumed that the HIGA 400 has already done every GBA bootstrap per ISIM that is performed over the Ub interface, that every IPTV client registers with the HIGA 400 and thus the HIGA 400 registers every IMPU assigned to the IPTV clients with the IMS network, and that the HIGA 400 has already advertised Ua proxy addresses as described above with reference to FIGS. 7-9.

In step S1401, the IPTV client 300 sends an HTTP request (i.e., an application protocol request) to the Ua proxy address that is associated with HTTP scheme. The HTTP request contains a "Host" header, which is filled with the FQDN (i.e., NAF-ID) of the target (i.e., destination) IPTV AS.

In step S1402, the Ua proxy 410 identifies an IMPU assigned to the IPTV client 300. It also determines whether or not a new TLS session should be established according to the TLS session/connection management function discussed in the previous section. In this example, it is determined that a new TLS session should be established.

In step S1403, the Ua proxy 410 derives a NAF-specific key by means of either GBA_ME or GBA_U from the specific ISIM that contains the IMPU identified in step S1402 and establishes a TLS session and connection with the IPTV AS 310.

In step S1404, if required (i.e., in the case that certificate-based TLS establishment without the NAF-specific key is performed in step S1403), HTTP Digest authentication is performed as per GBA Ua interface.

In step S1405, the Ua proxy 410 inserts the X-3GPP-Intended-Identity header filled with the IMPU identified in step S1402 and encapsulates the HTTP request into the TLS connection.

In step S1406, the IPTV AS 310 processes the HTTP request and returns a 200 OK response.

In step S1407, the Ua proxy 410 decapsulates the 200 OK response from the TLS connection and forwards it to the IPTV client 300, which is associated with the IMPU identified in step S1402.

In step S1408, the IPTV client 700 sends a HTTP request (i.e., an application protocol request) to a Ua proxy address that is associated with HTTP scheme. The HTTP request contains a "Host" header, which is filled with a NAF-ID of the destination IPTV AS 310. In this case, the NAF-ID is the same as the one in step S1401.

In step S1409, the Ua proxy 410 identifies an IMPU assigned to the IPTV client 700. It also determines whether or not a new TLS session should be established. In this example, since there is already an existing TLS session with the IPTV AS 310 for the HTTP protocol, it is determined that this TLS session should be reused.

In step S1410, the Ua proxy 410 establishes a TLS connection with the IPTV AS 310 by reusing the existing TLS session established in step S1403.

In step S1411, the Ua proxy 410 inserts the X-3GPP-Intended-Identity header filled with the IMPU identified in step S1409 and encapsulates the HTTP request into the TLS connection.

In step S1412, the IPTV AS 310 processes the HTTP request and returns a 200 OK response.

In step S1413, the Ua proxy 410 decapsulates the 200 OK response from the TLS connection and forwards it to the IPTV client 700, which is associated with the IMPU identified in step S1409.

ADVANTAGES OF THE INVENTION

The present invention is advantageous in that, by means of the HIGA, client terminals that are not IMS-enabled can communicate with an IMS AS that acts as a GBA NAF over a Ua interface. Moreover, according to some embodiments, the HIGA can effectively distinguish respective client terminals, and the HIGA can effectively share established sessions and connections.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. It should be noted that although the present invention is particularly advantageous when the client terminal is not IMS-enabled, a client terminal that is IMS-enabled is also able to communicate with the IMS AS via the multimedia gateway.

The invention claimed is:

1. A multimedia gateway that has an IP Multimedia Subsystem (IMS) Subscriber Identity Module (ISIM), a first interface to communicate with a client terminal, and a second interface to communicate over a Gm interface with Call Session Control Function (CSCF) and to communicate over a Ua interface with an IMS application server (IMS AS) that acts as a Generic Bootstrapping Architecture (GBA) Network Application Function (NAF) located in an IMS network, comprising:

at least one processor;

a non-transitory computer-readable storage medium further comprising computer-readable instructions, when executed by the at least one processor, are configured for:

assigning an IMS Public Identity (IMPU) obtained from the ISIM to the client terminal in response to a Session Initiation Protocol (SIP) registration request message received from the client terminal, and sending the SIP registration request message over the Gm interface for registering the IMPU assigned to the client terminal with the IMS network;

receiving, from the client terminal, an application protocol request message that specifies a destination IMS AS acting as GBA NAF and an application protocol, and identifying the IMPU assigned to the client terminal;

establishing a Transport Layer Security (TLS) session for communication with the IMS AS acting as GBA NAF by using the application protocol, and establishing a TLS connection with the IMS AS acting as GBA NAF over the TLS session;

sending authentication information derived from a Network Application Function (NAF)-specific key to the said IMS AS acting as GBA NAF derived from the ISIM that contains the identified IMPU to the IMS AS acting as GBA NAF;

sending the application protocol request message together with the identified IMPU to the IMS AS acting as GBA NAF through the TLS connection over the Ua interface;

receiving an application protocol response message from the IMS AS acting as GBA NAF through the TLS connection as a response to the application protocol request message; and sending the application protocol response message to the client terminal.

2. The multimedia gateway according to claim 1, wherein the computer-readable instructions, when executed by the at least one processor, are further configured for:

determining whether or not the TLS session is established upon receiving the application protocol request message, and establishing the TLS session if it is determined that the TLS session is not established.

3. The multimedia gateway according to claim 2, wherein the computer-readable instructions, when executed by the at least one processor, are further configured for:
storing a TLS session identity that identifies the TLS session in association with the destination IMS AS acting as GBA NAF, the application protocol, and the ISIM that contains the identified IMPU, and
for determining that the TLS session is established if the TLS session identity associated with the destination IMS AS acting as GBA NAF, the application protocol, and the ISIM that contains the identified IMPU, is stored.

4. The multimedia gateway according to claim 3, wherein the computer-readable instructions, when executed by the at least one processor, are further configured for:
determining whether or not the TLS connection is established upon receiving the application protocol request message, and
establishing the TLS connection if it is determined that the TLS connection is not established.

5. The multimedia gateway according to claim 4, wherein the computer-readable instructions, when executed by the at least one processor, are further configured for:
storing a TLS connection identity that identifies the TLS connection in association with the TLS session identity and the identified IMPU, and
determining that the TLS connection is established if the TLS connection identity associated with the TLS session identity and the identified IMPU, is stored.

6. The multimedia gateway according to claim 1, wherein the computer-readable instructions, when executed by the at least one processor, after further configured for:
assigning an address at which the application protocol request message is received from the client terminal, said address being unique to the client terminal,
storing the address in association with the IMPU assigned to the client terminal, and
notifying the client terminal of the address, and
wherein the IMPU assigned to the client terminal is identified based on association between the address and the IMPU.

7. The multimedia gateway according to claim 6, wherein the computer-readable instructions, when executed by the at least one processor, are further configured for:
assigning a plurality of the addresses, each of which is associated with different application protocols,
storing the plurality of the addresses in association with the IMPU assigned to the client terminal, and
notifying the client terminal of the plurality of the addresses.

8. The multimedia gateway according to claim 6, wherein:
the SIP registration request message specifies at least one application protocol scheme, and
the computer-readable instructions, when executed by the at least one processor, are further configured for:
assigning a same number of the addresses as a number of the at least one application protocol scheme, each of which is associated with a different application protocol schemes,
storing the same number of the addresses in association with the IMPU assigned to the client terminal, and
notifying the client terminal of the same number of the addresses.

9. The multimedia gateway according to claim 1, wherein the computer-readable instructions, when executed by the at least one processor, are further configured for:
storing a Universal Resource Identifier (URI) of the client terminal in association with the IMPU assigned to the client terminal, and
identifying the IMPU assigned to the client terminal based on association between the URI included in the application protocol request message and the IMPU.

10. The multimedia gateway according to claim 1, wherein the computer-readable instructions, when executed by the at least one processor, are further configured for:
sending the authentication information when the establishing means establishes the TLS session.

11. The multimedia gateway according to claim 1, wherein the computer-readable instructions, when executed by the at least one processor, are further configured for:
the authentication information sending means sends sending the authentication information upon request from the IMS AS after the establishing means establishes the TLS connection.

12. The multimedia gateway according to claim 1, wherein the application protocol request message is an HTTP Request message or an RTSP Request message.

13. A method for a multimedia gateway that has an ISIM, a first interface to communicate with a client terminal, and a second interface to communicate over a Gm interface with CSCF and to communicate over a Ua interface with an IMS AS that acts as a GBA NAF located in an IMS network, comprising:
receiving from the client terminal a Session Initiation Protocol (SIP) registration request message;
assigning an IMPU obtained from the ISIM to the client terminal in response to the SIP registration request message received from the client terminal, and sending the SIP registration request message over the Gm interface for registering the IMPU assigned to the client terminal with the IMS network;
receiving, from the client terminal, an application protocol request message that specifies a destination IMS AS acting as GBA NAF and an application protocol, and identifying the IMPU assigned to the client terminal;
establishing a TLS session for communication over the Ua interface with the IMS AS acting as GBA NAF by means of the application protocol, and establishing a Transport Layer Security (TLS) connection with the IMS AS acting as GBA NAF over the TLS session;
sending over the Ua interface authentication information derived from a NAF-specific key to the said IMS AS acting as GBA NAF derived from the ISIM that contains the identified IMPU to the IMS AS acting as GBA NAF;
sending the application protocol request message together with the identified IMPU to the IMS AS acting as GBA NAF through the TLS connection over the Ua interface;
receiving an application protocol response message from the IMS AS acting as GBA NAF through the TLS connection as a response to the application protocol request message; and
sending the application protocol response message to the client terminal.

14. The method according to claim 13, wherein in the step of establishing:
determines whether or not the TLS session is established if the application protocol request message is received in the step of receiving the application protocol request message, and establishes the TLS session if it is determined that the TLS session is not established.

15. The method according to claim 14, wherein in the step of establishing:
stores a TLS session identity that identifies the TLS session in association with the destination IMS AS acting as GBA NAF, the application protocol, and the ISIM that contains the identified IMPU, and
determines that the TLS session is established if the TLS session identity associated with the destination IMS AS acting as GBA NAF, the application protocol, and the ISIM that contains the identified IMPU, is stored.

16. The method according to claim 15, wherein in the step of establishing:
determines whether or not the TLS connection is established if the application protocol request message is received in the step of receiving the application protocol request message, and
establishes the TLS connection if it is determined that the TLS connection is not established.

17. The method according to claim 16, wherein in the step of establishing:
stores a TLS connection identity that identifies the TLS connection in association with the TLS session identity and the identified IMPU, and
determines that the TLS connection is established if the TLS connection identity associated with the TLS session identity and the identified IMPU, is stored.

18. The method according to claim 13, wherein:
in the step of assigning and registering:
assigns an address at which the application protocol request message is received from the client terminal in the step of receiving the application protocol request message, said address being unique to the client terminal,
stores the address in association with the IMPU assigned to the client terminal, and
notifies the client terminal of the address, and
wherein in the step of receiving the application protocol request message, identifies the IMPU assigned to the client terminal based on association between the address and the IMPU.

19. The method according to claim 18, wherein in the step of assigning and registering:
assigns a plurality of the addresses, each of which is associated with different application protocol schemes,
stores the plurality of the addresses in association with the IMPU assigned to the client terminal, and
notifies the client terminal of the plurality of the addresses.

20. The method according to claim 18, wherein:
the registration request message specifies at least one application protocol scheme, and
in the step of assigning and registering:
assigns a same number of the addresses as a number of the at least one application protocol scheme, each of which is associated with a different application protocol schemes,
stores the same number of the addresses in association with the IMPU assigned to the client terminal, and
notifies the client terminal of the same number of the addresses.

21. The method according to claim 13, wherein:
stores a URI of the client terminal in association with the IMPU assigned to the client terminal in the step of assigning and registering, and
identifies the IMPU assigned to the client terminal based on association between the URI included in the application protocol request message and the IMPU in the step of receiving the application protocol request message.

22. The method according to claim 13, wherein in the step of sending the authentication information, sends the authentication information when the TLS session is established in the step of establishing.

23. The method according to claim 13, wherein in the step of sending the authentication information, sends the authentication information upon request from the IMS AS acting as GBA NAF after the TLS connection is established in the step of establishing.

24. The method according to claim 13, wherein the application protocol request message is an HTTP Request message or an RTSP Request message.

* * * * *